United States Patent
Wong et al.

(10) Patent No.: US 10,476,680 B2
(45) Date of Patent: Nov. 12, 2019

(54) ELECTRONIC DEVICE WITH SELF-PROTECTION AND ANTI-CLONING CAPABILITIES AND RELATED METHOD

(71) Applicant: eMemory Technology Inc., Hsin-Chu (TW)

(72) Inventors: Wei-Zhe Wong, Hsinchu County (TW); Ching-Sung Yang, Hsinchu (TW)

(73) Assignee: eMemory Technology Inc., Hsin-Chu (TW)

( * ) Notice: Subject to any disclaimer, the term of this patent is extended or adjusted under 35 U.S.C. 154(b) by 185 days.

(21) Appl. No.: 15/423,562

(22) Filed: Feb. 2, 2017

(65) Prior Publication Data

US 2017/0222817 A1    Aug. 3, 2017

Related U.S. Application Data

(60) Provisional application No. 62/290,466, filed on Feb. 3, 2016.

(51) Int. Cl.
*H04L 29/06* (2006.01)
*H04L 9/32* (2006.01)
(Continued)

(52) U.S. Cl.
CPC ........ *H04L 9/3278* (2013.01); *G06F 12/1408* (2013.01); *G06F 21/445* (2013.01);
(Continued)

(58) Field of Classification Search
CPC .... G06F 12/1408; G06F 21/445; G06F 21/73; G06F 21/85; G06F 2212/1052;
(Continued)

(56) References Cited

U.S. PATENT DOCUMENTS 5,572,062 A * 11/1996 Iranmanesh ........ H01L 23/5252
257/50
7,500,272 B2  3/2009 Wheeler
(Continued)

FOREIGN PATENT DOCUMENTS

GB         2507988 A      5/2014
JP      2010-226603 A    10/2010
(Continued)

OTHER PUBLICATIONS

Wenjie Che et al., A Non-Volatile Memory Based Physically Unclonable Function without Helper Data, 2014, pp. 148-153, XP058062251, IEEE.

*Primary Examiner* — Jason K Gee
*Assistant Examiner* — Ka Shan Choy
(74) *Attorney, Agent, or Firm* — Winston Hsu

(57) ABSTRACT

An electronic device having anti-cloning function includes a first critical integrated circuit, which further includes a first security function block configured to authenticate an identity of a second critical integrated circuit in communication with the first critical integrated circuit, wherein the first security function block authenticates the identity of the second critical integrated circuit according to a chip identity of the second critical integrated circuit created using a non-volatile memory (NVM) physically unclonable function (PUF).

16 Claims, 6 Drawing Sheets

(51) Int. Cl.
*G06F 12/14* (2006.01)
*H04L 9/06* (2006.01)
*H04L 9/08* (2006.01)
*G06F 21/44* (2013.01)
*G06F 21/73* (2013.01)
*G06F 21/85* (2013.01)

(52) U.S. Cl.
CPC .............. *G06F 21/73* (2013.01); *G06F 21/85* (2013.01); *H04L 9/0662* (2013.01); *H04L 9/0866* (2013.01); *G06F 2212/1052* (2013.01)

(58) Field of Classification Search
CPC ... H04L 9/0662; H04L 9/0866; H04L 9/0869; H04L 9/3278
See application file for complete search history.

(56) References Cited

U.S. PATENT DOCUMENTS

| | | | |
|---|---|---|---|
| 8,046,571 | B1 | 10/2011 | Feng |
| 8,166,296 | B2 | 4/2012 | Buer |
| 8,667,265 | B1* | 3/2014 | Hamlet ................ H04L 9/0866 326/80 |
| 9,196,377 | B1* | 11/2015 | Park .................. H01L 27/11206 |
| 2006/0115081 | A1 | 6/2006 | Buer |
| 2010/0250936 | A1* | 9/2010 | Kusakawa ............ H04L 9/3278 713/169 |
| 2011/0002461 | A1 | 1/2011 | Erhart |
| 2014/0126306 | A1 | 5/2014 | Otterstedt |
| 2014/0201540 | A1 | 7/2014 | Li |
| 2015/0278551 | A1 | 10/2015 | Iyer |
| 2016/0036150 | A1* | 2/2016 | Campbell-Brown ........................ B41J 2/1753 439/77 |
| 2016/0172011 | A1 | 6/2016 | Ioannou |
| 2017/0024339 | A1* | 1/2017 | Watanabe ............... G06F 13/20 |

FOREIGN PATENT DOCUMENTS

| | | |
|---|---|---|
| JP | 2014-523192 A | 9/2014 |
| JP | 2015-103048 A | 6/2015 |
| JP | 2016-48951 A | 4/2016 |
| JP | 2017-11678 A | 1/2017 |
| JP | 2017-28354 A | 2/2017 |
| TW | 201514750 A | 4/2015 |
| TW | 201604711 A | 2/2016 |
| TW | 201631599 A | 9/2016 |

* cited by examiner

ELECTRONIC DEVICE WITH SELF-PROTECTION AND ANTI-CLONING CAPABILITIES AND RELATED METHOD

CROSS REFERENCE TO RELATED APPLICATIONS

This application claims the benefit of U.S. Provisional Application No. 62/290,466, filed on Feb. 3, 2016. The above-mentioned application is hereby incorporated by reference.

BACKGROUND OF THE INVENTION

1. Field of the Invention

The invention relates to an electronic device with authentication for performing anti-cloning and self-protection functions.

2. Description of the Prior Art

People now have an increasing reliance on electronic devices in our everyday lives. With demands of internet of things, identification and authentication for secure access and secure communication become significantly important. Much effort has been spent trying to enhance protection by improving software algorithms. However, despite the enhanced strength of software, there may still exist backdoors that an attacker can make use of by using techniques such as performing hardware reverse engineering, installing counterfeit devices, or using identity forgery to intercept the secure information. Thus, hardware with self-protection and anti-cloning functions becomes significantly important for business protection.

SUMMARY OF THE INVENTION

It is therefore one of the primary objectives of the claimed invention to provide an electronic device with self-protection and anti-cloning capabilities and a related method.

According to an exemplary embodiment of the claimed invention, an electronic device having anti-cloning function is disclosed. The electronic device includes a first critical integrated circuit, which further includes a first security function block configured to authenticate an identity of a second critical integrated circuit in communication with the first critical integrated circuit, wherein the first security function block authenticates the identity of the second critical integrated circuit according to a chip identity of the second critical integrated circuit created using a non-volatile memory (NVM) physically unclonable function (PUF).

According to another exemplary embodiment of the claimed invention, a method of performing an anti-cloning function in an electronic device is disclosed. The electronic device contains a first critical integrated circuit. The method includes a first security function block of the first critical integrated circuit obtaining a chip identity of a second critical integrated circuit in communication with the first critical integrated circuit, wherein the chip identity of the second critical integrated circuit is created using a nonvolatile memory (NVM) physically unclonable function (PUF). The method further includes the first security function block comparing the obtained chip identity of the second critical integrated circuit with a previously stored value of the chip identity of the second critical integrated circuit, and the first security function block authenticating an identity of the second critical integrated circuit when the obtained chip identity of the second critical integrated circuit matches the previously stored value of the chip identity of the second critical integrated circuit.

It is an advantage that the present invention provides a way to use chip identities that are created using intrinsic PUF techniques in order to uniquely identify critical integrated circuits used with an electronic device. In this way, the chip identities cannot be easily forged, and hackers cannot simply swap out an original integrated circuit with an unauthorized integrated circuit that may have a malicious function.

These and other objectives of the present invention will no doubt become obvious to those of ordinary skill in the art after reading the following detailed description of the preferred embodiment that is illustrated in the various figures and drawings.

DETAILED DESCRIPTION

The present invention seeks to provide a way for critical integrated circuits in an electronic device to undergo authentication so that users of the electronic device can be assured that the critical integrated circuits are authentic and have not been cloned.

Figure 1:
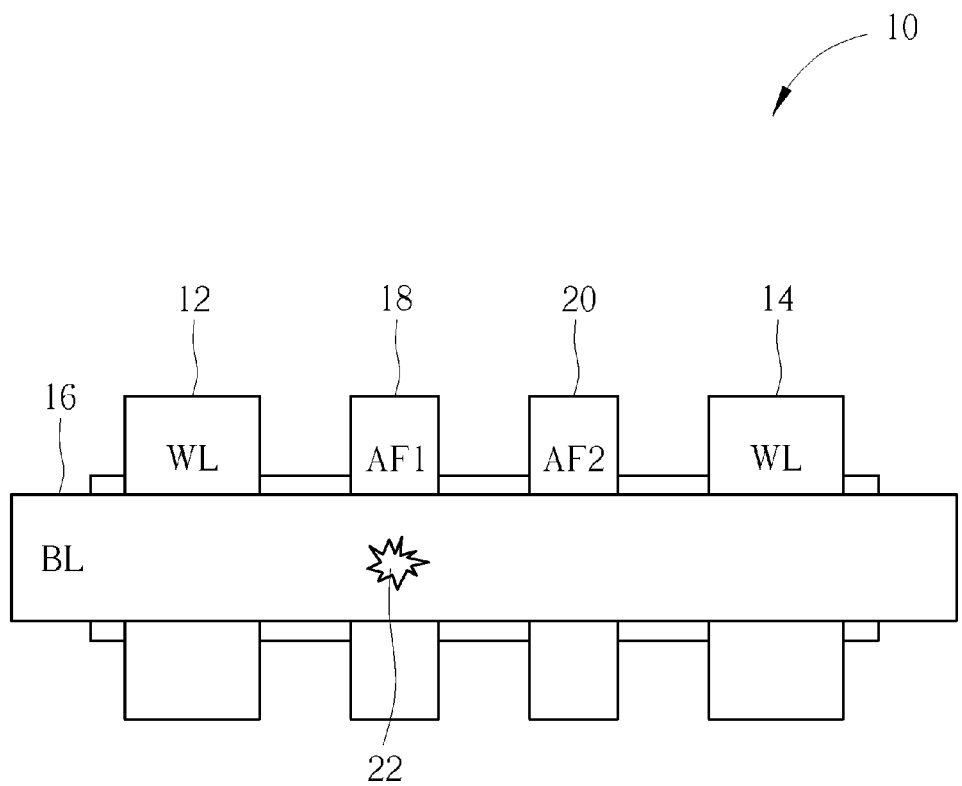
FIG. 1 illustrates an example of a non-volatile memory (NVM) physically unclonable function (PUF).

Please refer to FIG. 1. FIG. 1 illustrates a non-volatile memory (NVM) physically unclonable function (PUF) 10 (hereinafter NVM PUF), for example an antifuse PUF. In this example, the NVM PUF 10 contains a pair of symmetric antifuse structures, including a first antifuse structure 18 and a second antifuse structure 20, which are electrically connected to a first word line 12, a second word line 14, and a bit line 16. As is known by those skilled in the art, by applying programming voltage to the NVM PUF 10, ruptures form in antifuse structures. For instance, a rupture 22 occurs on the first antifuse structure 18 when a high level current flows through the NVM PUF 10 as the programming voltage is applied. This rupture 22 occurs naturally in some antifuse structures and does not occur in other antifuse structures depending on the intrinsic process variations of the antifuse structures. When a pair of identical antifuse structures has the programming voltage applied to it, such as what is shown in FIG. 1, one of the antifuse structures in the pair will rupture and the other will not. When many pairs of antifuse structures have the programming voltage applied to them, the rupture sites will occur at seemingly random locations due to the intrinsic process variations of the NVM PUF 10. The antifuse structures may be, for instance, capacitors or transistors.

By assigning a logic value of "1" to the first antifuse structure 18 having the rupture site 22 and other antifuse structures having no rupture sites, and by assigning a logic value of "0" to the second antifuse structure 20 and other antifuse structures having no rupture site, a code can be generated to uniquely identify a circuit. For instance, an integrated circuit may be assigned an eight-bit chip identity (ID) of "10010101". This code will be randomly generated for different pluralities of antifuse cells (different PUF blocks) and is specific to each block of antifuse cells. This code, in effect, acts as a type of hardware fingerprint. Since there is only a very small chance of two NVM PUFs that will be communicating with each other having the same chip ID, each NVM PUF can be thought of as having a unique chip ID.

With the antifuse structures discussed in the preceding paragraph, the antifuse structures may be antifuse programmable logic devices using one-time programmable non-volatile memory (OTP NVM). Other memory types could be used instead of OTP, such as multi-time programmable (MTP) or electrically erasable programmable read-only memory (EEPROM). It will be appreciated that other technologies may instead be used for generating the chip ID, such as an intrinsic charge of cells within an integrated circuit. The intrinsic charge is a natural property of the integrated circuit that is created at the time the integrated circuit is manufactured. Intrinsic charges having a value over a threshold may be assigned a logic value of "1", whereas charges no greater than the threshold may be assigned a logic value of "0", for example.

Other techniques may also be used to create chip IDs so that the chip IDs are sufficiently random and may effectively create unique identifiers for integrated circuits. The NVM used for creating the chip IDs can be fabricated using fully logic-compatible and mix-mode processes, fully high-voltage compatible processes, BCD (Bipolar-CMOS-DMOS) compatible processes, or fully CIS (CMOS image sensor) compatible processes.

Figure 2:
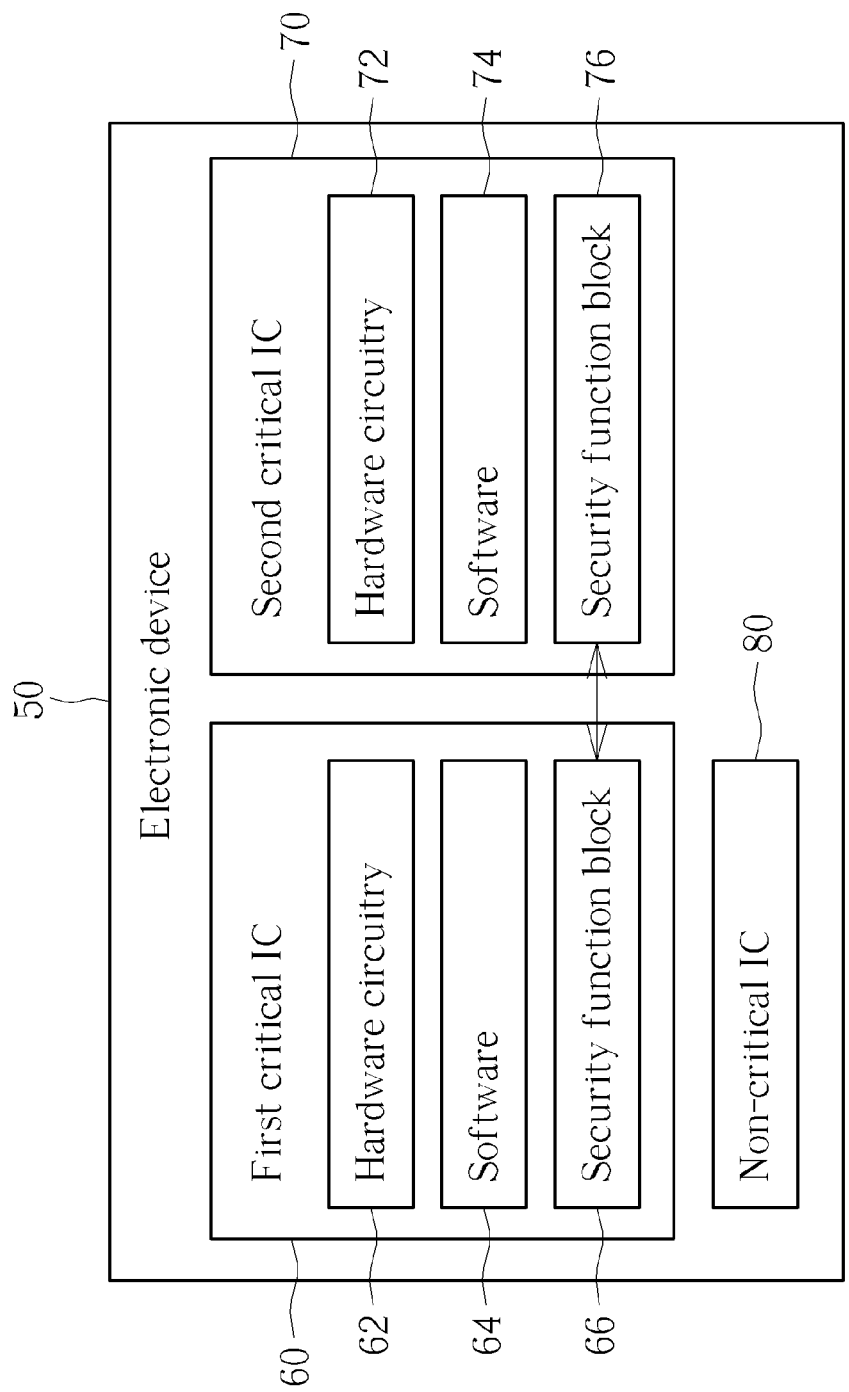
FIG. 2 is a functional block diagram showing an electronic device according to a first embodiment of the present invention.

Please refer to FIG. 2. FIG. 2 is a functional block diagram showing an electronic device 50 according to a first embodiment of the present invention. The electronic device 50 comprises a first critical integrated circuit (IC) 60, a second critical IC 70, and a non-critical IC 80. The first critical IC 60 and the second critical IC 70 are relatively important ICs compared to the non-critical IC 80, and consequently undergo extra authentication steps to ensure that the first critical IC 60 and the second critical IC 70 are genuine. Since the non-critical IC 80 does not require extra authentication steps, the non-critical IC 80 will not be a focus of this invention.

The first critical IC 60 comprises hardware circuitry 62 for performing the hardware functions that the first critical IC 60 is designed for. The first critical IC 60 also contains software 64 having executable code and a security function block 66. The second critical IC 70 contains similar elements as the first critical IC 60, and has hardware circuitry 72, software 74, and a security function block 76. As shown in FIG. 2, the security function block 66 of the first critical IC 60 communicates with the security function block 76 of the second critical IC 70 to perform mutual authentication of the first critical IC 60 and the second critical IC 70.

Figure 3:
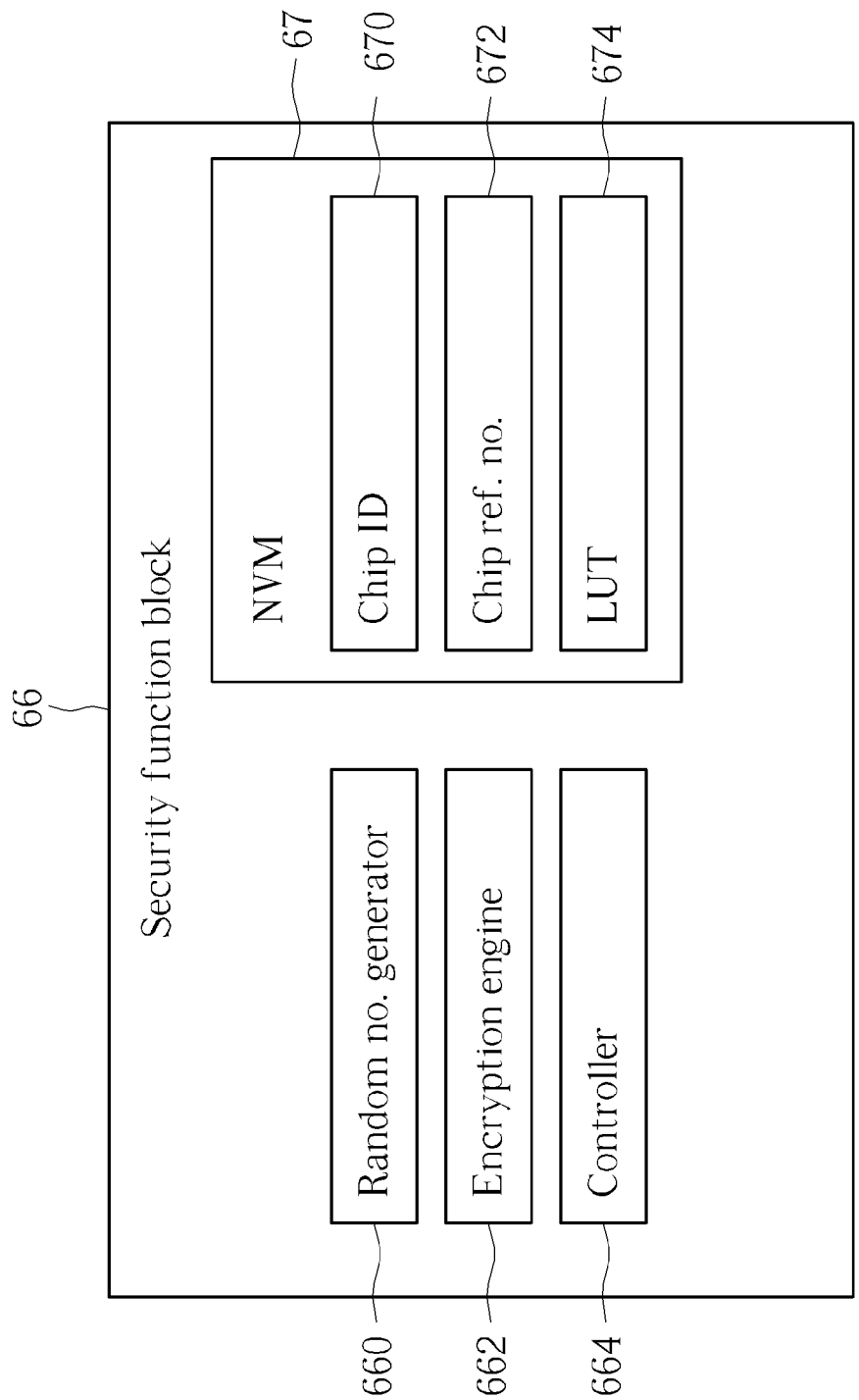
FIG. 3 is a functional block diagram showing a detailed view of the security function block.

Please refer to FIG. 3. FIG. 3 is a functional block diagram showing a detailed view of the security function block 66. Since the security function block 66 of the first critical IC 60 and the security function block 76 of the second critical IC 70 are essentially identical in function, only the security function block 66 of the first critical IC 60 is shown in more detail. The security function block 66 contains a random number generator 660, an encryption engine 662, a controller 664, and a non-volatile memory 67. The non-volatile memory 67 stores a chip ID 670 of the first critical IC 60 and a chip reference number 672 of the first critical IC 60 (since the security function block 66 is located inside the first critical IC 60), and a lookup table 674.

The chip ID 670 has been explained with respect to FIG. 1, and the chip ID 670 uniquely identifies the first critical IC 60 based on natural properties of the first critical IC 60. The chip reference number 672 may be a simple identifier for ICs to refer to other ICs located within or outside of the electronic device 50. For instance, in the electronic device 50 shown in FIG. 2, the chip reference number 672 for the first critical IC 60 may be "1", and the chip reference number for the second critical IC 70 may be "2". The non-critical IC 80 may optionally have a chip reference number of "3", but this is optional since the non-critical IC 80 does not need to undergo authentication. The lookup table 674 stores the chip reference number and the chip ID for each critical IC associated with the electronic device 50, and these values are known ahead of time. Therefore, when the chip reference number is known, the lookup table 674 can be used to look up the corresponding chip ID.

The encryption engine 662 can be used to encrypt data transmitted between critical ICs when mutual authentication is performed. The random number generator 660 can be used to generate encryption keys when encrypting data with the encryption engine 662.

Figure 4A:
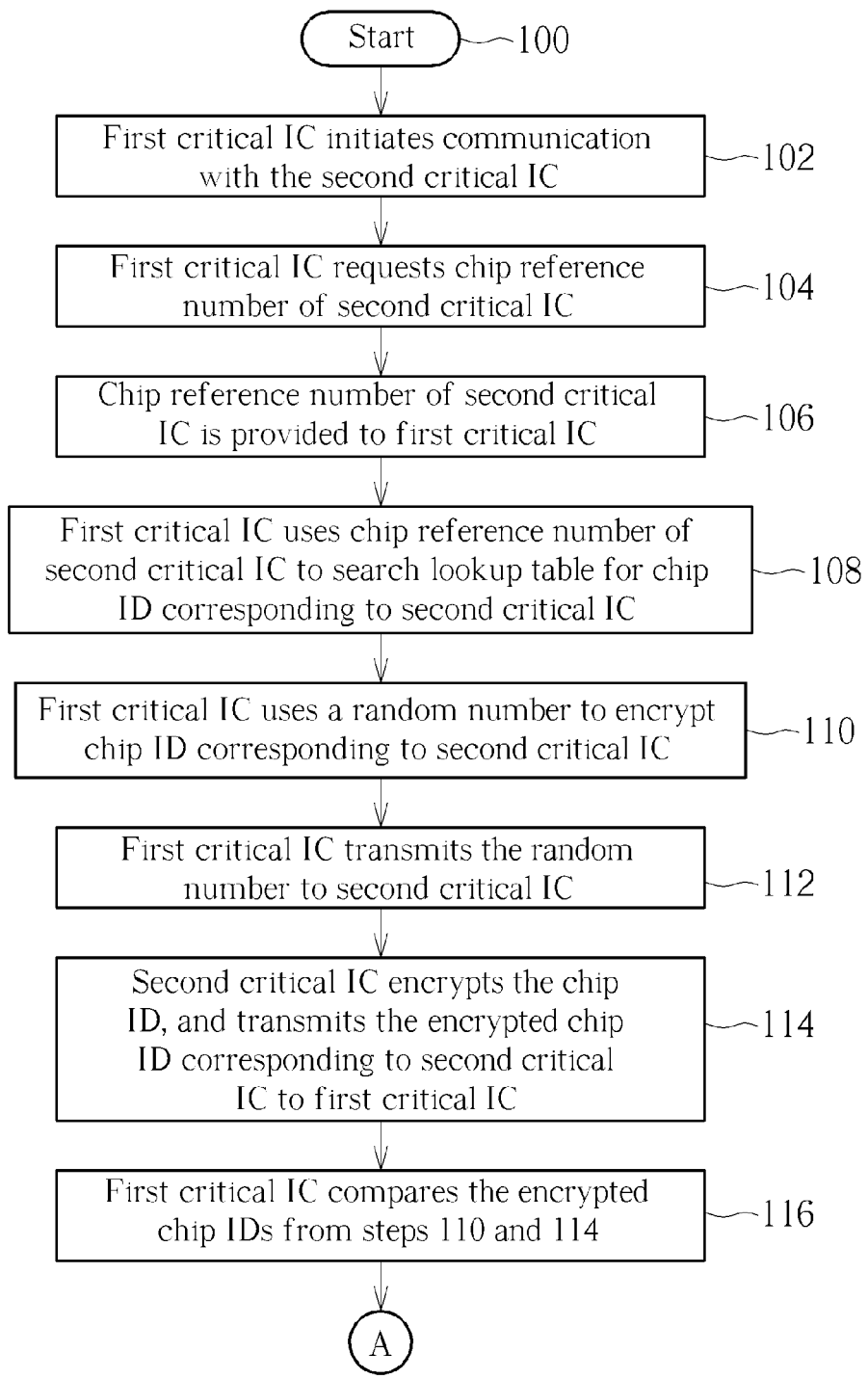
FIGS. 4A-4B show a flowchart describing the method of performing authentication of critical ICs according to the present invention.
Figure 4B:
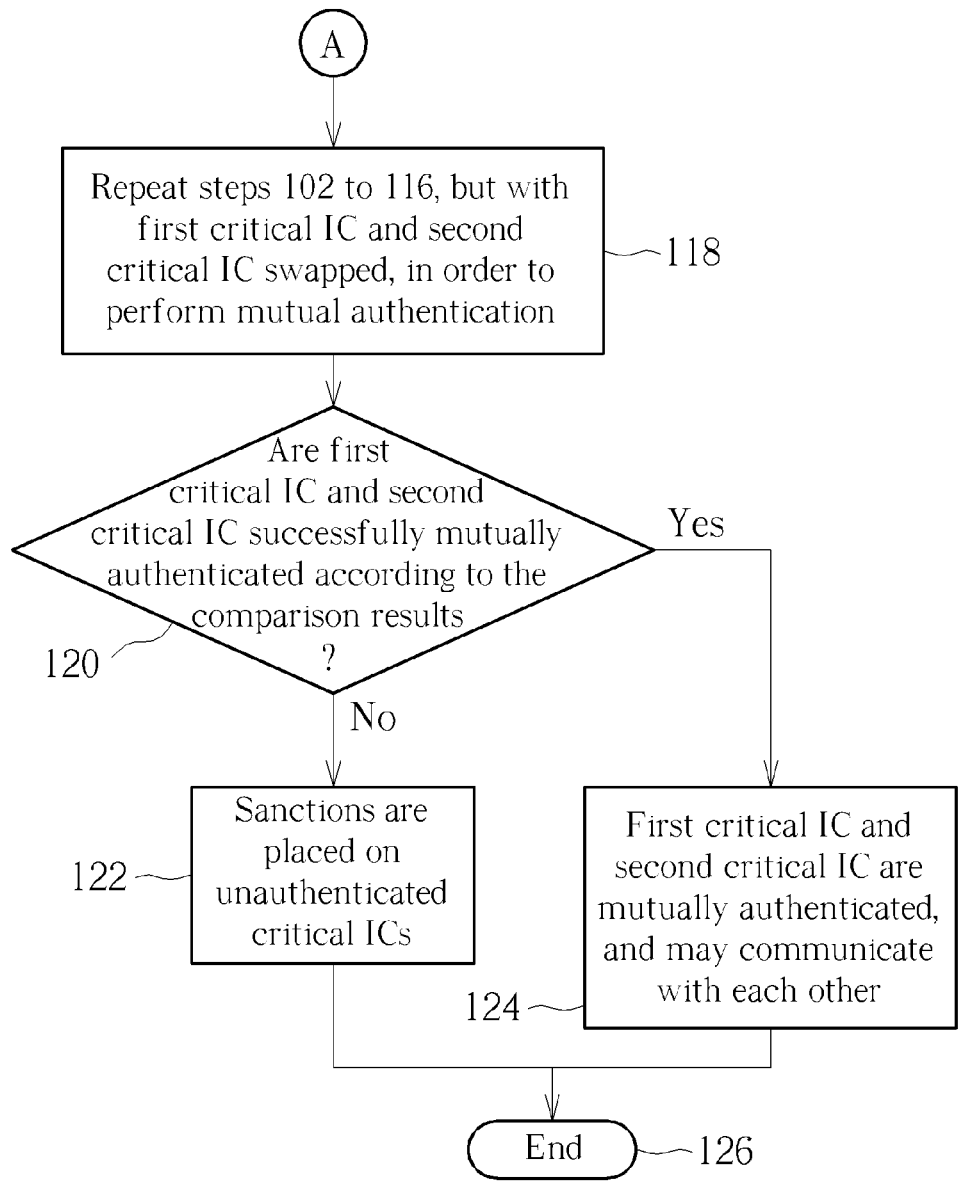

Please refer to FIG. 4A and FIG. 4B. FIGS. 4A-4B show a flowchart describing the method of performing authentication of critical ICs according to the present invention. Steps in the flowchart will be explained as follows.

Step 100: Start.

Step 102: The first critical IC 60 initiates communication with the second critical IC 70. For example, the first critical IC 60 may execute an input/output request that requires the second critical IC 70. Please note that since the first critical IC 60 is initiating communication with the second critical IC 70, all of the steps in the flowchart below are executed from the point of view of the first critical IC 60 authenticating the second critical IC 70. After the first critical IC 60 authenticates the second critical IC 70, the second critical IC 70 can then authenticate the first critical IC 60 in step 118, thereby performing mutual authentication.

Step 104: The security function block 66 of the first critical IC 60 requests the security function block 76 of the second critical IC 70 to provide the chip reference number of the second critical IC 70.

Step 106: The security function block 76 provides the chip reference number of the second critical IC 70 to the security function block 66.

Step 108: The security function block 66 uses the chip reference number of the second critical IC 70 to search the lookup table 674 for the chip ID corresponding to the second critical IC 70.

Step 110: The security function block 66 encrypts the chip ID corresponding to the second critical IC 70 using the encryption engine 662 in conjunction with the random number generator 660. That is, the random number generator 660 may provide a random number that is used to encrypt the chip ID corresponding to the second critical IC 70.

Step 112: The security function block 66 transmits the random number to the security function block 76 of the second critical IC 70.

Step 114: The security function block 76 of the second critical IC 70 encrypts the chip ID corresponding to the second critical IC 70 according to the random number, and transmits the encrypted chip ID corresponding to the second critical IC 70 to the security function block 66 of the first critical IC 60.

Step 116: The security function block 66 of the first critical IC 60 compares the encrypted chip ID corresponding to the second critical IC 70 resulting from step 110 and step 114. This comparison result will indicate whether the second critical IC 70 is successfully authenticated or not.

Step 118: Repeat steps 102 to 116, but with the first critical IC 60 and the second critical IC 70 swapped. In this way, mutual authentication of the first critical IC 60 and the second critical IC 70 may take place.

Step 120: Determine if the first critical IC 60 and the second critical IC 70 are successfully authenticated according to the two comparison results created from step 116 and step 118. If both of the comparison results are correct and the mutual authentication is successful, go to step 124. If one or both of the comparison results are not correct and the mutual authentication was not successful, go to step 122.

Step 122: Since the mutual authentication was not successful, sanctions can be placed on whichever critical IC did not pass authentication. Sanctions include disabling the functionality of the critical IC that did not pass authentication. For instance, if the second critical IC 70 did not pass authentication, the security function block 76 of the second critical IC 70 can disable the functionality or security information of the second critical IC 70. In another embodiment, the security function block 66 of the first critical IC 60 can also disable the functionality or security information of the second critical IC 70. In a different embodiment, the software 74 stored in the second critical IC 70 will only be unlocked (decrypted) when the second critical IC 70 passes authentication. In yet another embodiment, an alarm notification can be sent to a host device when at least one of the critical ICs does not pass authentication. Go to step 126.

Step 124: Since the mutual authentication was successful, the first critical IC 60 and the second critical IC 70 may communicate with each other. By performing mutual authentication, it can be known that both the first critical IC 60 and the second critical IC 70 are genuine, and are not counterfeit.

Step 126: End.

Figure 5:
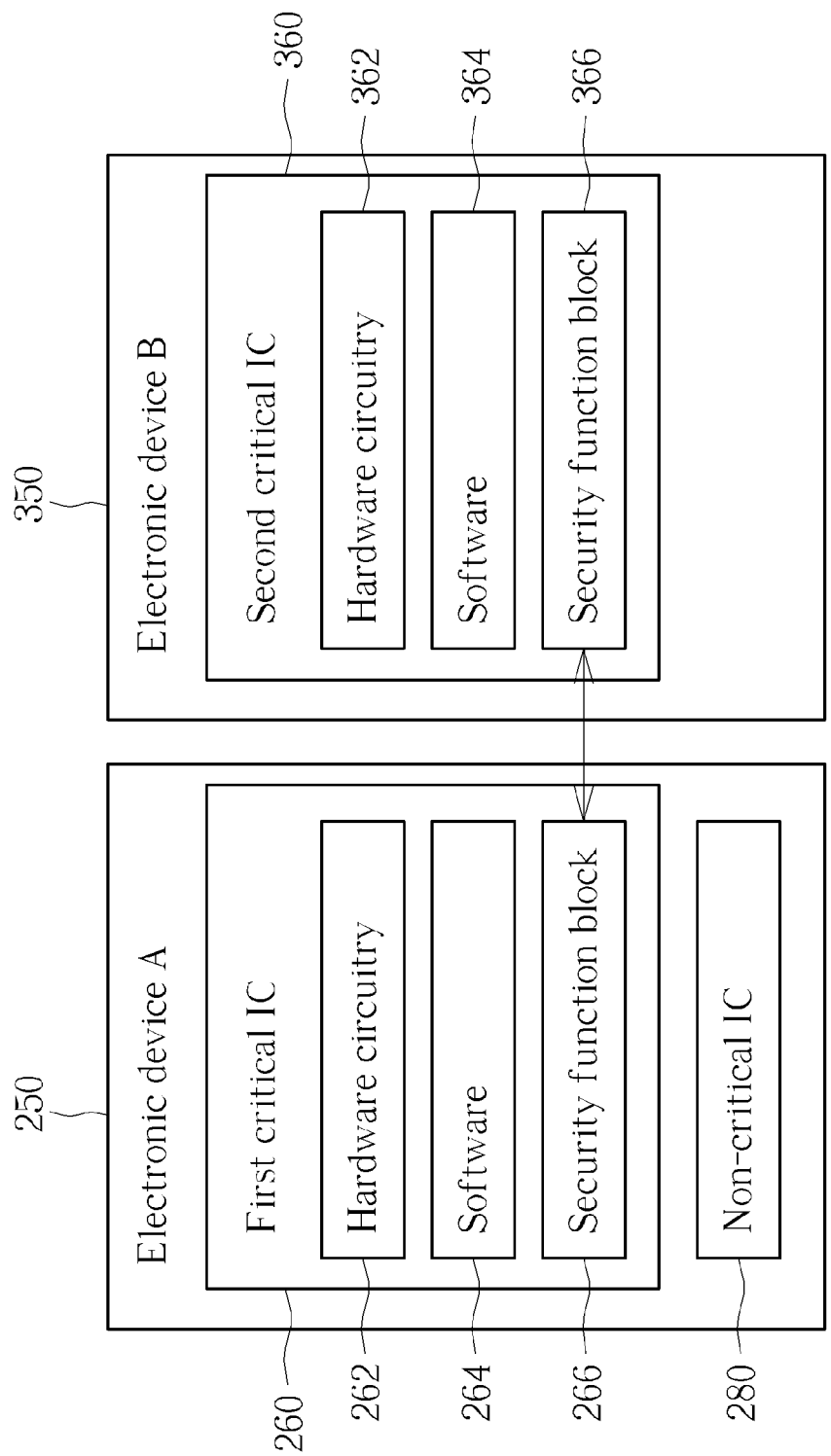
FIG. 5 is a functional block diagram showing a first electronic device and a second electronic device according to a second embodiment of the present invention.

Please refer to FIG. 5. FIG. 5 is a functional block diagram showing a first electronic device 250 and a second electronic device 350 according to a second embodiment of the present invention. The first electronic device 250 comprises a first critical IC 260 and a non-critical IC 280. The second electronic device 350 comprises a second critical IC 360. As with the electronic device 50 shown in the first embodiment depicted in FIG. 2, the first critical IC 260 comprises hardware circuitry 262, software 264, and a security function block 266. Similarly, the second critical IC 360 comprises hardware circuitry 362, software 364, and a security function block 366. The main difference from the first embodiment shown in FIG. 2 is that in the second embodiment shown in FIG. 5, the first critical IC 260 and the second critical IC 360 are located in separate electronic devices, i.e. the first electronic device 250 and the second electronic device 350, respectively. Thus, the present invention allows mutual authentication to take place no matter whether the critical ICs are located within a same electrical device or within separate electrical devices.

When mutual authentication takes place between two critical ICs, the critical IC that initiates communication with the other critical IC can be thought of as a "master" IC, with the other critical IC being thought of as a "slave" IC. This only affects the sequence in which the authentication protocol communication is carried out, and the master/slave arrangement can be switched without affecting the effectiveness of the present invention.

Mutual authentication can be performed between two critical ICs with different levels of frequency. For instance, mutual authentication can be performed each time two critical ICs attempt to communicate with each other. Otherwise, mutual authentication can be performed less frequently, such as when the critical ICs first power on or when the critical ICs are initialized.

As for the type of encryption used by the encryption engine 662, different types of encryption can be used, including symmetric and asymmetric. For the asymmetric encryption, a public key and a private key can be used, as is well known by those skilled in the art of encryption.

In summary, the present invention provides a way to use chip identities that are created using intrinsic PUF techniques in order to uniquely identify critical integrated circuits used within an electronic device. In this way, the chip identities cannot be easily forged, and hackers cannot simply swap out an original integrated circuit with an unauthorized integrated circuit that may have a malicious function or contain unauthorized or malicious code.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device having anti-cloning function, the electronic device comprising:
a first critical integrated circuit, comprising:
a first security function block configured to authenticate an identity of a second critical integrated circuit in communication with the first critical integrated circuit, wherein the first security function block authenticates the identity of the second critical integrated circuit according to a chip identity of the second critical integrated circuit created using a non-volatile memory (NVM) physically unclonable function (PUF);
wherein the chip identity of the second critical integrated circuit is created using at least one pair of symmetric antifuse structures in the NVM PUF that are electrically connected to each other, to a first word line, to a second word line, and to a same bit line, and the chip identity of the second critical integrated circuit is determined based on which antifuse structures rupture when programming voltage is applied; and
wherein the antifuse structures are ruptured according to intrinsic process variations of the antifuse structures.

2. The electronic device of claim 1, wherein the first critical IC disables functionality of the second critical integrated circuit when the first security function block fails to authenticate the identity of the second critical integrated circuit.

3. The electronic device of claim 1, wherein the first security function block sends an alarm notification to a host device when the first security function block fails to authenticate the identity of the second critical integrated circuit.

4. The electronic device of claim 1, wherein the chip identity of the second critical integrated circuit is encrypted with a random number by the first security function block before the random number is transmitted from the first security function block to the second critical integrated circuit.

5. The electronic device of claim 1, wherein the chip identity of the second critical integrated circuit created using the PUF is generated from intrinsic charge of the second critical integrated circuit which is produced at the time the second critical integrated circuit is manufactured.

6. The electronic device of claim 1, wherein the second critical integrated circuit comprises a second security function block, and the first critical integrated circuit and the second critical integrated circuit perform mutual authentication using corresponding chip identities.

7. The electronic device of claim 1, wherein the second critical integrated circuit is located within the electronic device.

8. The electronic device of claim 1, wherein the second critical integrated circuit is located outside the electronic device.

9. A method of performing an anti-cloning function in an electronic device, the electronic device comprising a first critical integrated circuit, the method comprising:
 a first security function block of the first critical integrated circuit obtaining a chip identity of a second critical integrated circuit in communication with the first critical integrated circuit, wherein the chip identity of the second critical integrated circuit is created using a non-volatile memory (NVM) physically unclonable function (PUF);
 the first security function block comparing the obtained chip identity of the second critical integrated circuit with a previously stored value of the chip identity of the second critical integrated circuit; and
 the first security function block authenticating an identity of the second critical integrated circuit when the obtained chip identity of the second critical integrated circuit matches the previously stored value of the chip identity of the second critical integrated circuit;
 wherein the chip identity of the second critical integrated circuit is created using at least one pair of symmetric antifuse structures in the NVM PUF that are electrically connected to each other, to a first word line, to a second word line, and to a same bit line, and the chip identity of the second critical integrated circuit is determined based on which antifuse structures rupture when programming voltage is applied; and
 wherein the antifuse structures are ruptured according to intrinsic process variations of the antifuse structures.

10. The method of claim 9, wherein the method further comprises the first critical IC disabling functionality of the second critical integrated circuit when the first security function block fails to authenticate the identity of the second critical integrated circuit.

11. The method of claim 9, further comprising the first security function block sending an alarm notification to a host device when the first security function block fails to authenticate the identity of the second critical integrated circuit.

12. The method of claim 9, wherein the chip identity of the second critical integrated circuit is encrypted with a random number by the first security function block before the random number is transmitted from the first security function block to the second critical integrated circuit.

13. The method of claim 9, wherein the chip identity of the second critical integrated circuit created using the PUF is generated from intrinsic charge of the second critical integrated circuit which is produced at the time the second critical integrated circuit is manufactured.

14. The method of claim 9, wherein the second critical integrated circuit comprises a second security function block, and the first critical integrated circuit and the second critical integrated circuit perform mutual authentication using corresponding chip identities.

15. The method of claim 9, wherein the second critical integrated circuit is located within the electronic device.

16. The method of claim 9, wherein the second critical integrated circuit is located outside the electronic device.

* * * * *